United States Patent [19]

Hasegawa et al.

[11] Patent Number: 4,610,810

[45] Date of Patent: Sep. 9, 1986

[54] RADIATION CURABLE RESIN, PAINT OR INK VEHICLE COMPOSITION COMPRISING SAID RESIN AND MAGNETIC RECORDING MEDIUM OR RESISTOR ELEMENT USING SAID RESIN

[75] Inventors: Yo Hasegawa, Nara; Satoshi Murakawa, Neyagawa; Yukihiro Shimazaki, Katano, all of Japan

[73] Assignee: Matsushita Electric Industrial Co., Ltd., Kadoma, Japan

[21] Appl. No.: 735,110

[22] Filed: May 17, 1985

Related U.S. Application Data

[62] Division of Ser. No. 620,331, Jun. 12, 1984.

[30] Foreign Application Priority Data

Jun. 17, 1983 [JP] Japan ................................. 109528
Jun. 20, 1983 [JP] Japan ................................. 58-111217

[51] Int. Cl.$^4$ ........................... H01B 1/02; H01C 2/00
[52] U.S. Cl. .................................. 252/511; 252/514; 252/512; 252/518; 29/610 R; 29/603
[58] Field of Search ............... 252/514, 512, 518, 511; 29/610 R, 603

[56] References Cited

U.S. PATENT DOCUMENTS 4,186,036  1/1980  Elms et al. .................... 252/512
4,353,816  10/1982  Zwasa .......................... 252/512
4,438,158  3/1984  Eichelberger et al. ............. 427/101

Primary Examiner—John Kight
Assistant Examiner—M. L. Moore
Attorney, Agent, or Firm—Cushman, Darby & Cushman

[57] ABSTRACT

A resin having a monomer unit structure represented by the formula:

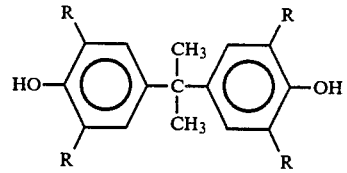

can be cured by an actinic irradiation such as electron beam, ultraviolet ray or infrared ray to give a heat-resistant, moisture-resistant, acid- and alkali-resistant and solvent-resistant film which is especially suitable for a paint vehicle resin for use in resistor element or magnetic recording medium. A composition comprising said resin modified by incorporating at least of one monomer or oligomer containing at least one acryl, methacryl or allyl group therein for facilitating the control of the characteristics of a resistor element obtained by using said composition is also disclosed.

8 Claims, 3 Drawing Figures

RADIATION CURABLE RESIN, PAINT OR INK VEHICLE COMPOSITION COMPRISING SAID RESIN AND MAGNETIC RECORDING MEDIUM OR RESISTOR ELEMENT USING SAID RESIN

This is a division of application Ser. No. 620,331 filed June 12, 1984.

BACKGROUND OF THE INVENTION

1. Field of the Invention

The present invention relates to a radiation curable resin, a paint or ink vehicle composition comprising said resin, a conductive or magnetic paint or ink comprising said vehicle composition, a resistor element using said conductive paint or ink and a magnetic recording medium using said magnetic paint or ink in a dried state.

2. Description of the Prior Art

A number of resins, which can be cured by ultraviolet ray, electron beam or the like, have recently been developed and are now commercially available. Compared with the conventional thermo-setting resins, these radiation curable resins harden in an extremely short time and exhibit excellent properties and therefore are in wide use.

However, since many of these resins are esters such as acrylates, methacrylates, allylates and the like, they have poor alkali-resistant and poor solvent-resistant properties compared with usual thermo-setting resins to limit the scope of their application. In addition to this, they have problem of poor heat-resistant property.

Furthermore, these resins are, in general, inferior in their surface hardness, to a phenolic resin or the like which has an excellent surface hardness. In the case wherein the resins are modified to intentionally be increased of their surface hardness, their adhesive property and flexibility would be decreased. Moreover, since the low molecular weight compounds are used, they have drawback in their poor leveling property when they are incorporated into paint. In contrast to this, the phenolic resin has a drawback that it requires a long curing time.

A carbon-resin composition type resistor element has been widely used as a fixed resistor or a variable resistor. Since the conventional resistor element of this type utilizes a thermo-setting resin as its binder resin, a process at high temperature and a long time is required for its manufacturing. Moreover, if the resistor element is laminated on a paper laminated phenolic sheet or the like, there has been a problem that a degradation of the substrate occurs during the thermo-setting process and an improvement therefor has long been awaited.

SUMMARY OF THE INVENTION

It is therefore the primary object of the present invention to provide a resin which can be cured in a short time by the irradiation of ultraviolet ray, electron beam or the like. The resin is purposed to have an excellent surface hardness and at the same time a good adhesive property, and to have remarkable heat-resistant and solvent-resistant properties which had not been observed with the conventional radiation curable resins. It is another object of the present invention to provide a paint or ink vehicle composition comprising said radiation curable resin as such, said resin and at least one of monomers or oligomer, said resin modifying dispersing properties of ferromagnetic powder or conductive powder.

It is further object of the present invention to provide a conductive or magnetic ink or paint comprising said vehicle composition and said ferromagnetic powder or conductive powder.

It is still another object of the present invention to provide a resistor element which has solved the above-described problems inherent to the manufacturing process of the conventional carbon-resin composition type resistor element.

Other objects and attendant advantages of the present invention will be made apparent to those skilled in the art by reading the following detailed description of the invention and attached claims.

DETAILED DESCRIPTION OF THE INVENTION

Figure 1A:
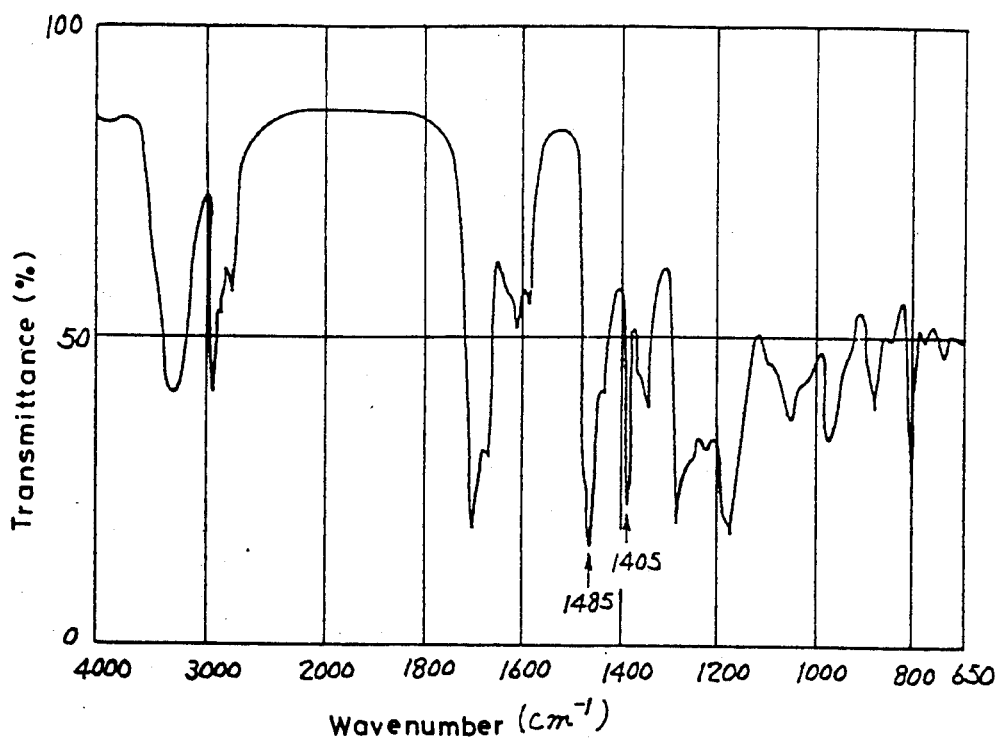
FIGS. 1(a) and 2 are infrared absorption spectra of the radiation curable resins manufactured in accordance with the present invention.

A radiation curable resin of the present invention is characterized to have a monomer unit structure represented by the formula:

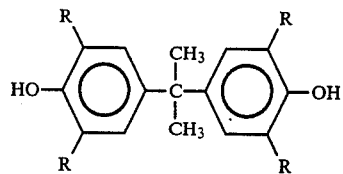

wherein, R is methylol group, acrylated or methacrylated methylol group, and the molar ratio of the methylol group to the acrylated or methacrylated methylol group is preferably in the range of from 20:1 to 1:3.

In the case wherein said molar ratio is more than 20:1, namely the amount of the methylol group is too much, the radiation curable property of the resin becomes poor and too much energy would be required for the curing. In contrast to this, if said molar ratio is less than 1:3, namely the amount of the methylol is too small, an effect of polymerization attributable to the condensation of the methylol group becomes small and, as the result, the effective improvement of the resin in its solvent-resistant and heat-resistant properties, being the object of the present invention, would be made unduly small.

The resin having a monomer unit structure of the present invention may be prepared by allowing tetramethylol bisphenol A (tetrahydroxymethylbisphenol A), obtained by a reaction of one mole of bisphenol A with four moles of formaldehyde in a basic solution, to react with acrylic acid, methacrylic acid or a lower alcohol ester thereof. The condensation product of bisphenol A and formaldehyde has been known. The present inventors have found that, by esterifying the methylol group in the above-mentioned condensation product with acrylic acid or methacrylic acid, a radiation curable resin having an excellent radiation curable property, a high surface hardness, an excellent adherence property and a good leveling property can be obtained.

The radiation curable resin prepared in accordance with the present invention can be cured by the irradiation of ultraviolet ray, infrared ray or electron beam in a short time to give a coated film of smooth and high surface hardness. The resin of the present invention can also be used in paint for magnetic recording media with remarkable advantage in the dispersion of ferromagnetic powder.

Incidentally, the resistor element in accordance with the present invention is characterized in the use of the above-mentioned resin, namely, the acrylic acid or methacrylic acid ester of the bisphenol A-formaldehyde condensation product, or in the use of a mixture composed of said ester and a monomer or oligomer containing at least one acryl, methacryl or allyl group therein, or the both, as the binder resin.

The conductive ink can be prepared by dispersing the conventionally known conductive powder such as metal powder, carbon black or graphite in the binder resin and by adding solvent therein if desired. The resistor element of excellent characteristics can be prepared in a short time by applying the above-mentioned ink on a substrate, drying, if desired, and irradiating, electron beam or infrared ray by means of a radiation type heater for a short time.

As the monomer or oligomer to be mixed with the above-mentioned ester, those having at least one acryl, methacryl or allyl group therein may be exemplified. These monomers or oligomers may be mixed with the ester individually but two or more of the monomers and oligomers may be used together in a mixture system. In most cases, the use of the mixture system facilitates the control of the characteristics of the obtained resistor element.

The available monomer or oligomer may be exemplified as acrylates of primary or polyhydric alcohol or oligoacrylates such as methyl acrylate, ethyl acrylate, propyl acrylate, butyl acrylate, hydroxyethyl acrylate, 2-ethylhexyl acrylate, ethylene glycol diacrylate, trimethylolpropane triacrylate, pentaerythritol triacrylate, epoxy acrylates, oligoester acrylates, urethane acrylates or the like. They may further be exemplified as methacrylates of primary or polyhydric alcohol such as methyl methacrylate, ethyl methacrylate, propyl methacrylate, butyl methacrylate, hydroxyethyl methacrylate, 2-ethylhexyl methacrylate, diethylene glycol dimethacrylate, trimethylolpropane trimethacrylate or the like, or allyl alcohol, diallyl ether, diallyl adipate, diallyl phthalate, both end diallylates of low molecular weight polyurethane or the like.

The mixing ratio of the acrylate or methacrylate solution of the bisphenol A-formaldehyde condensation product to the above-mentioned monomer or oligomer can arbitrarily be selected in compliance with the characteristics required for the resistor element.

As the conductive powder to be dispersed in the resin composition, any of the known conventional ones may be used. They can be exemplified as metal powders of silver, copper or the alloy thereof, metal oxides powder, metal carbides powder, metal nitrides powder, metal borides powder, carbon black, graphite, mixtures thereof or the like. The mixing ratio of the conductive powder to the above-mentioned binder resin composition may be in the conventionally known range. The binder resin composition and the conductive powder may be mixed with optional addition of solvent and dispersed thoroughly in a known manner to give a conductive ink. This conductive ink may be painted on a substrate and irradiated by electron beam after drying if desired, or irradiated by means of radiation type heater to give a resistor element.

The obtained resistor element is extremely hard and is particularly suited for the resistor element used in a variable resistor which requires a good abrasion resistant property.

In manufacturing magnetic recording media, such as magnetic tape or magnetic disk, the previously described radiation curable resin of this invention may also be used with advantages in view of its excellent adherence property to the substrate and good abrasion resistant property of the coated surface. Particularly advantageous feature of the resin is in its excellent ability of dispersing the ferromagnetic powder which will be demonstrated in the description of preferred embodiment below.

In this case also, the resin may be combined with at least one of the above-mentioned monomer or oligomer as has been described with respect to the resistor element.

DESCRIPTION OF THE PREFERRED EMBODIMENT

In the following description, the present invention will be elucidated in more detail by way of example.

EXAMPLE 1

Bisphenol A (1 mole) and 38% formaldehyde aqueous solution (4.5 moles) were placed in a four-necked flask equipped with a thermometer, a stirrer, a reflux condenser and a dropping funnel, and a 6N aqueous solution of sodium hydroxide (2.2 moles) was dropped therein through the dropping funnel while the temperature of the reaction mixture was kept under 60° C. After the dropping was finished, the mixture was allowed to react at 60±1° C. for 2 hours. The reaction mixture was then neutralized with 6N sulfuric acid aqueous solution and washed with water. It was thereafter condensed under reduced pressure to give an 85% solution consisting mainly of tetramethylol bisphenol A. Nine (9) parts by weight of this solution was then combined with 1 part by weight of n-propanol and 7 parts by weight of isophorone to be dissolved completely and thereafter 8 parts by weight of acrylic acid and 0.02 part by weight of p-toluene sulfonic acid were added therein. The mixture was allowed to react at 60±1° C. for 6 hours under the reduced pressure by means of aspirator. After the reaction, the mixture was cooled down to 40° C. and the unreacted acrylic acid was removed off under reduced pressure to give 20 part by weight of an ester solution.

Figure 1B:
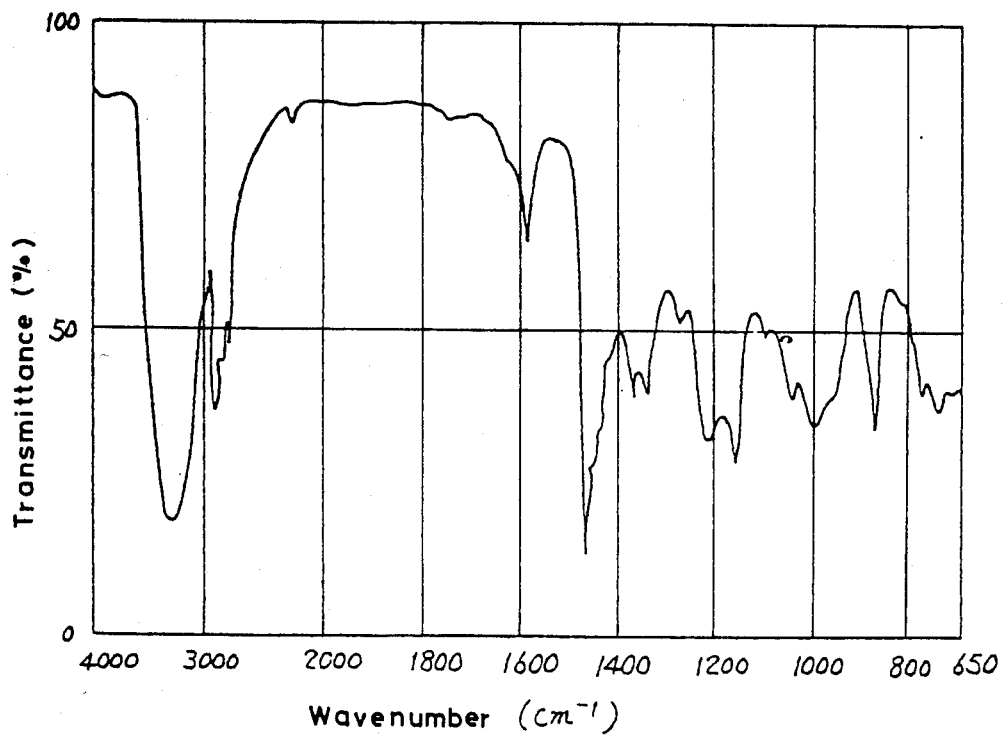
FIG. 1(b) is an infrared absorption spectrum of an intermediate obtained in the manufacturing process of said resin.

An infrared absorption spectrum of the resultant resin is shown in FIG. 1(a) and that of the intermediate, tetramethylolbisphenol A is shown in FIG. 1(b). From the ratios of the absorbance at 1485 cm$^{-1}$ attributable to the benzene ring and absorbance at 1405 cm$^{-1}$ attributable to the vinyl group, it was confirmed that the resin of this example contains 2.2 moles of acryl ester for the previously described monomer unit.

To the obtained solution, there was added benzoine ethyl ether (ethyl benzoate) of an amount equivalent to 2% for the solid resin component and the mixture was applied to an alumina substrate using a doctor blade of 25μ and dried. This was then irradiated by means of high pressure mercury lamp of 120 W/cm placed at a distance of 10 cm for 30 seconds. The obtained film was very smooth and hard showing a pencil hardness of 6H. Soaking of this film in molten solder at 350° C. for 10 seconds resulted in a little browning but no peeling off of the film from the substrate or no crack of the film itself was occurred. Furthermore, no change was observed with this film after being washed in a ultrasonic trichloroethylene bath. In this example, an extention of the ultraviolet irradiation to 1 minute raised the surface pencil hardness to 8H. For a comparison, a molten solder soaking test at 350° C. of an ultraviolet cured product of commercially available polyepoxyacrylate containing 2% of ethyl benzoate was performed. As a result, the resin was decomposed to evolve a gas. An ultrasonic washing of a commercially available product in trichloroethylene resulted in decrease in surface hardness of the product.

Next, the obtained solution was applied to an iron plate in the thickness of 50μ and dried, and then irradiated by an electron beam of 165 KeV in 10 M rad to give a hard film of a pencil hardness of 7H. A post-curing of this film at 190° C. for 5 minutes gave it a pencil hardness of 9H.

EXAMPLE 2

The reaction time for the esterification in the process described in Example 1 was extended to 15 hours to give a result that the content of the acryl ester in said monomer unit reached 3 moles for the monomer unit. This resin was cured in a similar manner as described in Example 1 to acquire a pencil hardness of 5H by the ultraviolet irradiation for 15 seconds. A molten solder soaking test of this product at 350° C. showed a slight foaming.

EXAMPLE 3

A process similar to that described in Example 1 was performed. In this case, however, the amount of the acrylic acid added at the preparation of the acryl ester was 4 parts by weight and the reaction time was 2 hours. As a result, a conversion rate of the methylol group to the acrylate ester was 0.05 mole for the monomer unit. An absorption attributable to condensation of methylol group was observed around 1650 cm$^{-1}$. This resin gave a coated film having a pencil hardness of 4H by an ultraviolet irradiation for 30 seconds. A coated film having a pencil hardness of 7H was obtained by irradiating the resin using an electron beam of 165 KeV in 50 M rad. A post-curing of this film at 190° C. for 5 minutes gave it a surface a pencil hardness of 9H.

EXAMPLE 4

Figure 2:
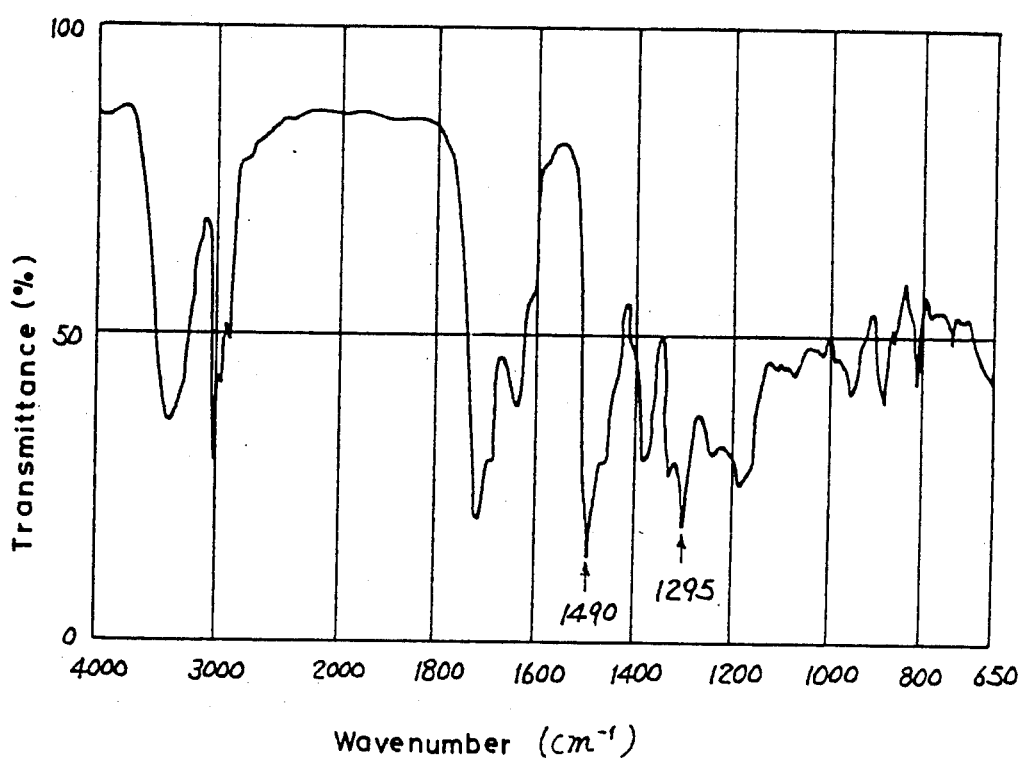

A process similar to that described in Example 1 was performed. In this case, however, 8.5 parts by weight of methacrylic acid was used in lieu of the acrylic acid and the reaction mixture was allowed to react at 60±1° C. for 6 hours to give 2.2 parts by weight of a resin solution containing 2.4 moles of methacryl ester. The content of the ester was determined by the ratios of the absorbance of benzene ring at 1490 cm$^{-1}$ to that of vinyl group at 1295 cm$^{-1}$. An infrared absorption spectrum of this resin is shown in FIG. 2.

Ethyl benzoate (benzoine ethyl ether) was added to the obtained solution in the amount of 2% for the solid resin and the mixture was applied to an alumina substrate and dried. A coated film having a pencil hardness of 7H was obtained by irradiating ultraviolet ray for 30 sec. No peeling off or cracking was observed with this film at a molten solder soaking test at 350° C.

Next, the solution was applied to an iron plate and dried, and then irradiated by an electron beam of 165 KeV in 10 M rad to give a hard coated film having a pencil hardness of 8H. The pencil hardness of this film was raised to 9H or more by post-curing at 190° C. for 5 minutes.

A coated film obtained by applying this solution to a paper laminated phenolic sheet, drying and electron beam irradiating also showed a pencil hardness of 8H and a adhesive property of 100% at "cellophan tape peeling test".

EXAMPLE 5

A process similar to that described in Example 4 was performed. In this case, however, the amount of the methacrylic acid added was 10 parts by weight and the reaction time was 15 hours, and a resin containing 3 moles of methacryl ester for a monomer unit was obtained. This product gave a coated film having a pencil hardness of 5H by an ultraviolet ray irradiation for 15 seconds which showed no peeling off or cracking in a molten solder soaking test at 350° C.

EXAMPLE 6

A process similar to that described in Example 4 was performed. In this case, however, the amount of the added methacrylic acid was 5 parts by weight and the reaction time was 2 hours to give a resin containing 0.05 mole of methacryl ester for a monomer unit. Like in the case of Example 3, an absorption attributable to the condensation of methylol group was observed around 1650 cm$^{-1}$. This resin also gave a coated film having a pencil hardness of 5H by an ultraviolet irradiation for 30 seconds. An electron beam irradiation in 50 M rad resuls in a coated film having a pencil hardness of 7H. A post-curing of this film at 190° C. for 5 minutes raised its pencil hardness to 9H or more.

EXAMPLE 7

The solution obtained in a process of Example 1 was combined with a solution of a commercially available urethane acrylate (mean molecular weight; about 30,000) in 1:1 ratio of the solid resin components. To the mixture, there was added ethyl benzoate (benzoin ethyl ether) in the amount of 2% for the solid component and the resultant mixture was applied to a film (75μ) of polyethylene terephthalate and dried. The resin was cured by irradiating ultraviolet ray for 15 seconds. The coated film was clear and smooth, and having a pencil hardness of 5H. No peeling off or cracking was occurred in a folding test of 180° around a cylinder of 3 cm diameter.

EXAMPLE 8

A mixed solution obtained in Example 7 (containing no ethyl benzoate) was combined with commercially available γ-iron oxide powder (needless of 0.3 μm length) and fine powder of carbon, and the combined mixture was milled in a pot mill to give a magnetic ink. As a result of filtration of this ink through a filter paper performed in order to examine the extent of dispersion, the whole amount was able to be filtered out. In contrast to this, as a result of filtration of a magnetic ink which did not contain the resin prepared in accordance with the present invention but did contain only urethane acrylate resin, it was found that about 50–70% of the powder was remained on the filter paper. From this experiment, it was confirmed that the radiation curable resin of the present invention was suited for dispersing the magnetic powder.

EXAMPLE 9

A white ink was prepared by mixing the solution, obtained in accordance with Example 1, with alumina powder of the amount equivalent to the solid component in the solution and titanium dioxide of 1/10 weight of the solid component followed by a milling by a three-roll mill. The ink was applied to an iron plate, dried, and then irradiated by an electron beam of 165 keV at 10 M rad (for 1 second or less) to give a coated film. The film surface was smooth and showed a pencil hardness of 9H or more, and the film showed an excellent adhesion property to the iron plate.

EXAMPLE 10

(a) Preparation of acryl ester solution of bisphenol A-formaldehyde condensate:

Bisphenol A (1 mole) and 38% formalin (4.5 moles) were placed in a four-necked flask equipped with a thermometer, a stirrer, a reflux condenser and a dropping funnel and a 6N aqueous solution of sodium hydroxide (2.2 moles) was dropped therein through the dropping funnel while the temperature of the reaction mixture was kept under 60° C. After the dropping was finished, the mixture was allowed to react at 60±1° C. for 2 hours. The reacted mixture was then neutralized with 6N sulfuric acid aqueous solution and washed with water. Thereafter, it was condensed under reduced pressure to give an 85% solution consisting mainly of tetramethylolbisphenol A.

A hundred (100) parts by weight of this solution was then mixed with 50 parts by weight of isophorone and the mixture was removed of residual moisture under reduced pressure. To the resultant mixture, there were added 70 parts by weight of acrylic acid containing 4000 ppm of hydroquinone and 0.2 part by weight of p-toluene sulfonic acid. The mixture was then allowed to react at 80±1° C. for 1 hour and the unreacted acrylic acid was removed off under reduced pressure. Thereafter, a 60% solution was prepared by adding ethanol.

(b) Resistance ink:

a resistance ink was prepared by adding 15 g of carbon fine powder and 30 g of butyl Carbitol to 50 g of the solution obtained in the above (a) and by milling the mixture with a three-roll mill.

(c) Resistor:

A resistor was prepared by applying the above-described resistance ink to a paper laminated phenolic sheet, drying and then irradiating an electron beam of 165 KeV at 15 M rad thereon. The time required for the electron beam irradiation was 0.1 second or less for the length of 15 cm. The resultant resistor was a hard one having a pencil hardness of 8H and an area resistance of 0.5 kΩ/□. This resistor was subjected to a heat-resistant test at 85° C. and a moisture-resistant test of 95% R. H. at 60° C. to give the resistance changes of −3.0% and 1.0%, respectively after 1000 hours. As a result of a rotation test performed on a variable resistor assembled with this resistor element, it was confirmed that no abnormality in noise or the like was observed with this resistor after 30,000 rotations. For a comparison, a heat-resistant test and a moisture-resistant test were performed on a resistor prepared by using a resistance ink of thermo-setting type resin. As the result, the resistance changes of −5.5% and 2.5% were observed, respectively.

EXAMPLE 11

A process similar to that described in Example 10 was performed. In this case, however, 35 parts by weight of methacrylic acid was used in lieu of the 70 parts by weight of acrylic acid and the removal of the residual monomer was omitted. The obtained resistor element had an area resistance of 0.7 kΩ/□ and a pencil hardness of 9H or more, and showed the resistance changes of −3.0% and 1.0%, respectively, after the heat-resistant and moisture-resistant tests.

EXAMPLE 12

A process similar to that described in Example 10 was performed. In this case, however, 3 g of trimethylolpropane trimethacrylate and 30 g of epoxy acrylate (Viscoat #540, available from Osaka Yuki Kagaku K.K.) were used in addition to 50 g of acryl ester condensate solution as the binder resin, and the amount of carbon fine powder was 30 g. The obtained resistor element had area resistance of 0.6 kΩ/□ and a pencil hardness of 7H and showed the resistance changes of −9.5% and −1.5%, respectively, after the heat-resistant and moisture-resistant tests.

EXAMPLE 13

A process similar to that described in Example 12 was performed. In this case, however, 18 g of oligoester acrylate (Aromix M-8030, available from Toa Gosei K.K.) and 6 g of hexanediol diacrylate were used in addition to 50 g of acryl ester condensate solution as the binder resin. The obtained resistor element had area resistance of 1 kg/□ and a pencil hardness of 9H, and showed, after the heat-resistant and moisture-resistant tests, the resistance changes of −8.5% and 2.5%, respectively.

EXAMPLE 14

A process similar to that described in Example 10 was performed. In this case, however, 5 g of diethyleneglycol dimethacrylate was added to 50 g of ester condensate solution as the binder resin to give a resistor element having an area resistance of 0.5 kΩ/□ and a pencil hardness of 9H or more. This resistor element showed, after the heat-resistant and moisture-resistant tests, the resistance changes of −2.5% and 1.5%, respectively.

EXAMPLE 15

A process similar to that described in Example 12 was performed. In this case, however, 20 g of diallyl orthophthalate prepolymer and 10 g of pentaerythritol triacrylate were used in addition to 50 g of acryl ester condensate solution as the binder resin to give a resistor element having an area resistance of 1 kg/□ and a pencil hardness of 9H or more. This resistor element showed, after the heat-resistant and moisture-resistant tests, the resistance changes of −8.0% and 1.5%, respectively.

EXAMPLE 16

A resistor element was prepared by applying the resistance ink obtained in the process of Example 10 on a paper laminated phenolic sheet and irradiating the applied substrate by long wave infrared radiation equipment of 1.8 kW output. The distance between the radiator and the substrate was 10 cm. The obtained resistor element had an area resistance of 0.6 kΩ/□ and a pencil hardness of 9H or more. It showed, after the heat-resistant and moisture-resistant tests, the resistance changes of −3.5% and 1.2%, respectively.

What is claimed is:

1. A resistor element characterized in that which is prepared by curing a conductive paint or ink comprising an acryl or methacryl ester solution of bisphenol A-formaldehyde condensation product, and a conductive powder.

2. A resistor element characterized in that which is prepared by curing a conductive paint or ink comprising a mixture of an acryl or methacryl ester solution of bisphenol A-formaldehyde condensation product and at least one monomer or oligomer containing at least one acryl, methacryl or allyl group therein, or a mixture thereof.

3. A resistor element as claimed in claim 1, wherein said conductive powder is a metal powder of silver, copper or their alloy, a metal oxide powder, a metal carbide powder, a metal boride powder, carbon black, graphite or a mixture thereof.

4. A resistor element as claimed in claim 2, wherein said monomer or oligomer is selected from the group consisting of:

(a) acrylate or oligoacrylate of primary or polyhydric alcohol, (b) methacrylate or oligomethacrylate of primary or polyhydric alcohol, and (c) allyl alcohol, diallyl ether, diallyl adipate, diallyl phthalate and both end diallylate of low molecular weight polyurethane.

5. A resistor element comprising a conductive powder and a cured resin having a monomer structure represented by the formula:

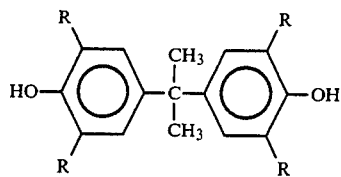

wherein, R is methylol group, acrylated or methacrylated methylol group, and the molar ratio of the methylol group to the acrylated or methacrylated methyol group is in the range of from 20:1 to 1:3.

6. A resistor element as claimed in claim 5, wherein said cured product further comprises at least one monomer or oligomer containing at least one acryl, methacryl or allyl group therein.

7. A magnetic recording medium having as its magnetic coating film a magnetic powder and a cured resin having a monomer structure represented by the formula:

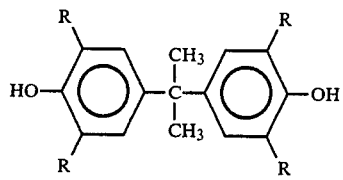

wherein, R is methylol group, acrylated or methacrylated methylol group, and the molar ratio of the methylol group to the acrylated or methacrylated methyol group in the range of from 20:1 to 1:3.

8. A magnetic recording medium as claimed in claim 7, wherein said cured product further comprises at least one monomer or oligomer containing at least one acryl, methacryl or allyl group therein.

* * * * *